United States Patent
Metcalfe

(10) Patent No.: US 7,225,523 B2
(45) Date of Patent: Jun. 5, 2007

(54) METHOD FOR COUPLING AND EXPANDING TUBING

(75) Inventor: Paul David Metcalfe, Peterculter (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/323,705

(22) Filed: Dec. 30, 2005

(65) Prior Publication Data

US 2006/0107514 A1    May 25, 2006

Related U.S. Application Data

(60) Division of application No. 10/940,485, filed on Sep. 14, 2004, now abandoned, which is a continuation of application No. 09/381,508, filed as application No. PCT/GB98/00863 on Mar. 20, 1998, now Pat. No. 6,789,822.

(30) Foreign Application Priority Data

Mar. 21, 1997   (GB) .................................. 9705928.1
Nov. 4, 1997    (GB) .................................. 9723338.1

(51) Int. Cl.
F16B 7/00   (2006.01)
B23P 11/00  (2006.01)

(52) U.S. Cl. .................... 29/507; 29/523; 403/297; 403/309; 403/312; 285/404; 285/370; 166/207

(58) Field of Classification Search .................. 29/507, 29/523; 403/277, 282, 285, 297, 300, 309, 403/310, 312; 285/333, 404, 331, 242.1, 285/382.2, 382.4, 145.1, 302, 382.1; 166/206, 166/207, 242.1
See application file for complete search history.

(56) References Cited

U.S. PATENT DOCUMENTS

| | | | |
|---|---|---|---|
| 1,678,640 A | 7/1928 | Hall | |
| 2,155,370 A | 4/1939 | Hall et al. | |
| 2,217,370 A | 10/1940 | Johnston | |
| 2,226,804 A | 12/1940 | Carroll | |
| 2,858,894 A | 11/1958 | Akeyson | |
| 2,873,985 A | 2/1959 | Baldwin, Jr. | |
| 3,353,599 A | 11/1967 | Swift | |
| 3,766,991 A | 10/1973 | Brown | |
| 3,851,983 A | 12/1974 | MacKenzie | |
| 3,857,450 A | 12/1974 | Guier | |
| 3,913,687 A | 10/1975 | Gyongyosi et al. | |
| 4,076,280 A | 2/1978 | Young | |
| 4,449,596 A | 5/1984 | Boyadjieff | |

(Continued)

FOREIGN PATENT DOCUMENTS

EP    0 171 144 A1   2/1986

(Continued)

Primary Examiner—Jermie E. Cozart
(74) Attorney, Agent, or Firm—Patterson & Sheridan, L.L.P.

(57) ABSTRACT

An expandable tubing assembly comprises a tubular connector defining overlapping longitudinal slots, the connector comprising end portions and an intermediate portion. The slots extend over the whole length of the connector, but the only slot overlap occurs in the intermediate portion. The assembly further comprises lengths of expandable tubing defining overlapping longitudinal slots and having end portions defining nodes between and beyond the ends of the tubing slots. Tubing threads are formed on the end most tubing nodes. The connector end portions define threads and are coupled with the threads formed on the nodes of the respective end portions of the tubing lengths.

20 Claims, 2 Drawing Sheets

U.S. PATENT DOCUMENTS

| | | |
|---|---|---|
| 4,550,937 A | 11/1985 | Duret |
| 4,611,838 A | 9/1986 | Heilmann et al. |
| 4,619,472 A | 10/1986 | Kozono et al. |
| 4,625,796 A | 12/1986 | Boyadjieff |
| 4,711,474 A | 12/1987 | Patrick |
| 4,754,807 A | 7/1988 | Lange |
| 4,771,829 A | 9/1988 | Sparlin |
| 4,793,422 A | 12/1988 | Krasnov |
| 4,813,493 A | 3/1989 | Shaw et al. |
| 4,878,546 A | 11/1989 | Shaw et al. |
| 4,985,975 A | 1/1991 | Austin et al. |
| 5,015,017 A | 5/1991 | Geary |
| 5,069,761 A | 12/1991 | Krings et al. |
| 5,181,570 A | 1/1993 | Allwin et al. |
| 5,251,709 A | 10/1993 | Richardson |
| 5,339,895 A | 8/1994 | Arterbury et al. |
| 5,366,012 A | 11/1994 | Lohbeck |
| 5,388,651 A | 2/1995 | Berry |
| 5,480,196 A | 1/1996 | Adams, Jr. |
| 5,667,011 A | 9/1997 | Gill et al. |
| 5,787,980 A | 8/1998 | Sparlin et al. |
| 5,855,242 A | 1/1999 | Johnson |
| 5,901,789 A | 5/1999 | Donnelly et al. |
| 5,924,745 A | 7/1999 | Campbell |
| 5,984,568 A | 11/1999 | Lohbeck |
| 6,012,522 A | 1/2000 | Donnelly et al. |
| 6,109,349 A | 8/2000 | Simone et al. |
| 6,158,507 A | 12/2000 | Rouse et al. |
| 6,203,766 B1 | 3/2001 | Kawakami et al. |
| 6,273,634 B1 | 8/2001 | Lohbeck |
| 6,315,040 B1 | 11/2001 | Donnelly |
| 6,322,109 B1 | 11/2001 | Campbell et al. |
| 6,409,175 B1 | 6/2002 | Evans et al. |
| 6,454,013 B1 | 9/2002 | Metcalfe |
| 6,543,816 B1 | 4/2003 | Noel |
| 2002/0070031 A1 | 6/2002 | Voll et al. |
| 2002/0163192 A1 | 11/2002 | Coulon et al. |

FOREIGN PATENT DOCUMENTS

| | | |
|---|---|---|
| EP | 0 659 975 | 6/1995 |
| WO | WO 93/12323 A1 | 6/1993 |
| WO | WO 93/25800 | 12/1993 |
| WO | WO 96/37680 | 11/1996 |
| WO | WO 96/37681 | 11/1996 |
| WO | WO 97/17524 | 5/1997 |
| WO | WO 97/21901 | 6/1997 |
| WO | WO 98/22690 | 5/1998 |
| WO | WO 98/32948 | 7/1998 |

METHOD FOR COUPLING AND EXPANDING TUBING

CROSS-REFERENCE TO RELATED APPLICATIONS

This application is a divisional of U.S. patent application Ser. No. 10/940,485, filed Sep. 14, 2004 now abandoned, which is a continuation of U.S. patent application Ser. No. 09/381,508, filed Sep. 21, 1999, now U.S. Pat. No. 6,789,822, which is the National Stage of International Application No. PCT/GB98/00863, filed on Mar. 20, 1998 and published under PCT Article 21(2) in English, and claims priority of United Kingdom Applications No. 9705928.1 filed on Mar. 21, 1997 and No. 9723338.1 filed on Nov. 4, 1997. All the above referenced patent applications are incorporated by reference in their entireties.

BACKGROUND OF THE INVENTION

1. Field of the Invention

This invention relates to a connector, and in particular to a connector forming part of an expandable tubing assembly. The invention also relates to a method of connecting lengths of expandable tubing.

2. Description of the Related Art

WO93\25800 describes expandable tubing defining overlapping longitudinal slots. On expansion of the tubing, by pushing or pulling a mandrel through the tubing, the slots expand to form diamond-shaped apertures. The expansion is accommodated by deformation of the fingers of metal between the slots, this deformation taking place predominantly at the slot ends, and also by circumferential extension of the parts of the tubing wall beyond the slot ends. In expandable tubing developed by the applicants radial expansion is achieved with the parts of the tubing wall between and beyond the slot ends experiencing little if any deformation, these parts being known as the tubing "nodes".

Arrangements for connecting lengths of slotted tubing are disclosed in WO96\37687 and WO97\21901, the disclosures of which are incorporated herein by reference. Both of these documents describe arrangements in which the end of one length of tubing defines a male coupling portion which is received within a female coupling portion on the other length of tubing and attached thereto.

In another coupling arrangement, the ends of the tubing lengths are received within an external coupling sleeve. However, it has been found that, following expansion, the sleeve contracts radially by a significant extent; this creates a restriction in the bore defined by the tubing.

SUMMARY OF THE INVENTION

According to the present invention there is provided a method of connecting lengths of expandable tubing defining overlapping longitudinal slots, the method comprising: providing a tubular connector defining overlapping 10 longitudinal slots and comprising end portions; providing lengths of expandable tubing defining overlapping longitudinal slots and having end portions defining nodes between and beyond the ends of the slots and connecting the connector end portions to nodes of respective end portions of the tubing lengths.

According to another aspect of the present invention there is provided an expandable tubing assembly comprising: a tubular connector defining overlapping longitudinal slots and comprising end portions; lengths of expandable tubing defining overlapping longitudinal slots and having end portions defining nodes between and beyond the ends of the slots; and the connector end portions being; coupled to the nodes of the respective end portions of the tubing lengths.

The formation of the connections between the connector end portions and the nodes of the tubing end portions provides for a relatively secure connection. Preferably, the connector end portions and the nodes of the tubing end portions are threaded, and the absence of significant deformation at the nodes facilitates maintenance of a secure connection on expansion of the tubing lengths and the connector.

Preferably also, the connector further comprises an intermediate portion selected to be of corresponding configuration to the tubing lengths, such that the expansion characteristics of the connected tubing assembly will be substantially constant over the connection.

Preferably also, each connector end portion defines a slot to receive a corresponding tongue provided on the respective tubing length end portion.

According to a further aspect of the present invention there is provided an expandable tubing assembly comprising: a tubular connector defining overlapping longitudinal slots, the connector comprising end portions and an intermediate portion; and lengths of expandable tubing defining overlapping longitudinal slots and having end portions coupled to the connector end portions, at least the connector intermediate portion being of corresponding configuration to the tubing lengths, such that the expansion characteristics of the intermediate portion and the tubing lengths correspond.

This aspect of the invention provides a connector which expands in a compatible manner to the adjacent tubing and thus facilitates reliable expansion of an expandable tubing string.

According to still further aspect of the present invention there is provided an arrangement for coupling lengths of expandable tubing, the arrangement comprising a sleeve defining overlapping longitudinal slots, first and second tubing lengths defining overlapping longitudinal slots, in use the sleeve and tubing lengths being radially expandable by deformation of fingers of material where adjacent circumferentially spaced slots overlap, and connecting means for connecting the sleeve to the ends of the tubing lengths, the deformable fingers of the sleeve being axially spaced from the endmost deformable fingers of the respective tubing lengths.

In use, on expansion of the tubing lengths and the sleeve, the deformation of the sleeve fingers will take place following the deformation of the endmost fingers of the first tubing length and prior to the deformation of the endmost fingers of the second tubing length. It has been found that, following expansion, there is little or no diametrical shrinkage of the sleeve, and the force necessary to expand the coupled tubing ends is approximately half that required to expand tubing ends coupled with a sleeve in which there is substantial overlap between the sleeve and the tubing ends.

The invention also relates to a method for coupling the ends of first and second lengths of expandable tubing defining overlapping longitudinal slots and deformable fingers of material where adjacent circumferentially spaced slots overlap, the method comprising the steps of: providing a sleeve defining overlapping longitudinal slots and deformable fingers of material where adjacent circumferentially spaced slots overlap; coupling the sleeve to the ends of first and second lengths of expandable tubing such that the fingers of the sleeve are longitudinally spaced from the endmost fingers of the tubing lengths; and forcing an expansion member through the connected tubing lengths to expand the sleeve and tubing lengths.

As used herein, the term slots is intended to encompass slots which extend through the walls of the sleeve and tubing, slots which extend only part way through the walls and any other appropriate weakening of the walls such as lines of bores or scallops.

Preferably, the connecting means are provided at circumferentially spaced locations at the end of the tubing lengths beyond the endmost tubing fingers, and at the ends of the sleeve beyond the respective endmost tubing fingers. The connecting means may comprise pins, rivets, screws and the like for location in appropriate aligned bores provided in the sleeve and tubing lengths. Single fasteners may be provided beyond each tubing finger, or multiple fasteners may be provided.

Preferably also, the unexpanded sleeve is of larger diameter than the tubing lengths. Most preferably, the sleeve and the tubing length are each of substantially constant diameter along their length.

According to a still further aspect of the present invention there is provided an arrangement for coupling lengths of expandable tubing, the arrangement comprising a longitudinally slotted sleeve and first and second tubing lengths defining overlapping longitudinal slots. In use, the tubing lengths are radially expandable by deformation of fingers of material where adjacent circumferentially spaced slots overlap, and connecting means for connecting the sleeve to the ends of the tubing lengths.

The sleeve may be in the form of longitudinally extending strips of metal. Most preferably, the strips are rectilinear. On expansion, the strips of the sleeve move radially outwardly and separate circumferentially. Initially, that is prior to expansion, the strips may be circumferentially connected, by frangible links 119 such as wire, webs of material or one or more welds, to facilitate sleeve handling.

The invention further relates to a method for coupling the ends of first and second lengths of expandable tubing defining overlapping longitudinal slots and deformable fingers of material where adjacent circumferentially spaced slots overlap, the method comprising the steps of: providing a sleeve comprising longitudinally extending strips of material; coupling the sleeve to the ends of first and second. lengths of expandable tubing; and forcing an expansion member through the connected tubing lengths to expand the sleeve and tubing lengths.

Preferably, the connecting means are provided at circumferentially spaced locations at the end of the tubing lengths beyond the endmost tubing fingers, and at the ends of the sleeve. The connecting means may comprise pins, rivets, screws and the like for location in appropriate aligned bores provided in the sleeve and tubing lengths. Single fasteners may be provided beyond each tubing finger, or multiple fasteners may be provided.

Preferably also, the unexpanded sleeve is of larger diameter than the tubing lengths. Most preferably, the sleeve and the tubing length are each of substantially constant diameter along their length.

BRIEF DESCRIPTION OF THE DRAWINGS

Aspects of the present invention will now be described, by way of example, with reference to the accompanying; drawings, in which.

DETAILED DESCRIPTION OF THE PREFERRED EMBODIMENT

Figure 1:
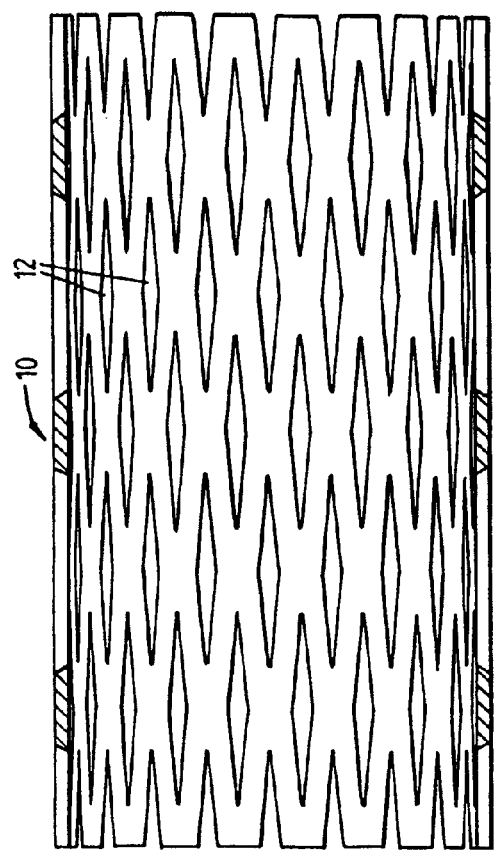
FIG. 1 is a sectional view of a length of expandable tubing, shown in an expanded configuration.

Reference is first made to FIG. 1 of the drawings, which illustrates a length of expandable tubing 10. In its initial configuration, the tubing 10 is simply a length of pipe in which a series of longitudinal slots 12 have been machined. Applying a radially outward force to the tubing wall, by passing a mandrel through the tubing, causes the tubing to expand such that the slots 12 become diamond-shaped openings.

Figure 2:
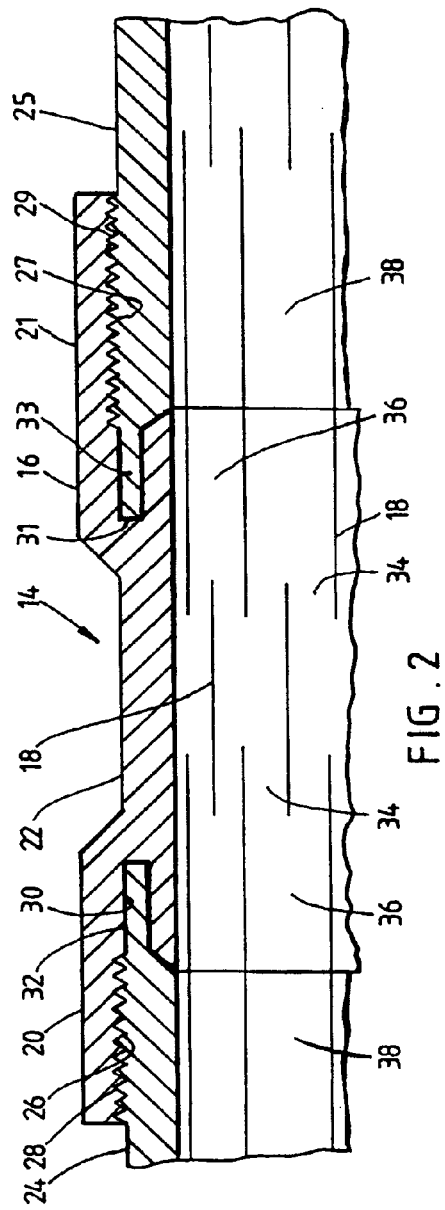
FIG. 2 is a sectional view of an expandable tubing assembly in accordance with a first embodiment of the present invention.

The tubing 10 is supplied in lengths suitable for transportation and handling and these are joined to one another on surface to create a tubular string. The assembly 14 illustrated in FIG. 2 of the drawings allows lengths of expandable tubing 10 to be connected to form a string, as will now be described.

The assembly 14 comprises a tubular connector 16 defining overlapping longitudinal slots 18, the connector 16 comprising end portions 20, 21 and an intermediate portion 22. The slots 18 extend over the whole length of the connector 16, but the only slot overlap occurs in the intermediate portion 22.

The connector 16 is utilized to join the ends of two lengths of expandable tubing 24, 25, the ends of which are adapted to engage with the connector end portions 20, 21 as described below.

The connector intermediate portion 22 is of substantially the same wall thickness as the tubing 24, 25, however the connector end portions 20, 21 are upset, that is they include portions of greater wall thickness than the tubing 24, 25 and are of a greater diameter than the tubing 24, 25. The inner walls of each connector end portion 20, 21 define threads 26, 27 for engaging corresponding threads 28, 29 on the outer surface of the tubing 24, 25. Inwardly of the threads 26, 27 the end portions 20, 21 define grooves 30, 31 to receive corresponding tongues 32, 33 provided on the ends of the tubing lengths 24, 25.

As noted above, the connector slots 18 only overlap in the intermediate portion 22, such that on expansion of the connector 16 and the tubing lengths 24, 25 the connector 16 is only subject to significant deformation in the intermediate portion 22, at and adjacent the slot overlap 34. The amount of deformation is substantially lower in the rest of the connector 16, particularly in the "nodes" 36 between the ends of the longitudinally aligned slots 18. The tubing lengths 24, 25 feature nodes 38 between and beyond the ends of the tubing slots 12 and the tubing threads 28, 29 are formed on the end most tubing nodes.

In use, the tubing lengths 24, 25 are connected by first making up the connector 16 to one tubing length 24, and then making up the second tubing length 25 to the other end of the connector 16. A number of tubing lengths are connected in this way to form a tubing string, which is run into a wellbore. Once in a desired position, an expansion mandrel is run through the tubing string, and radially extends the connector 16 and the tubing lengths 24, 25. In doing so, the connector slots 18 and tubing slots 12 are expanded to define diamond shaped openings, as are illustrated in FIG. 1. As described above the connector is only subject to substantial deformation at the slot overlaps 34, such that the metal of the slot end portions 20, 21 is subject to minimal deformation. As the deformation of the metal of the connector occurs primarily in the intermediate portion 22, which is of corresponding diameter and thickness to the tubing 24, 25, the expansion properties of the connector 16 are similar to the tubing 24, 25, such that the connector 16 and tubing lengths 24, 25 will expand in corresponding and predictable manner, minimizing the occurrence of irregularities in the internal diameter of the expanded tubing string.

From the above description it will be apparent to those of skill in the art that the assembly 14 provides a convenient means for connecting expandable tubing lengths. It is recognized that, for some applications, users may prefer to include coupling means between the connector end portions and the tubing lengths in addition to the thread connection, and in such cases screws, rivets, pins or the like may be provided to extend between the end portions 20, 21 and the tubing lengths 24, 25.

Figure 3:
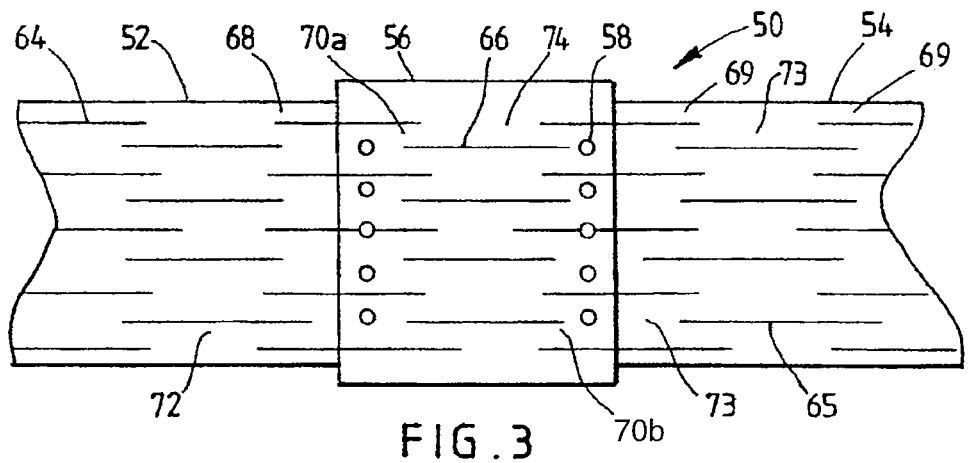
FIG. 3 is a schematic plan view of an arrangement for coupling lengths of expandable tubing in accordance with a second embodiment of the present invention.
Figure 4:
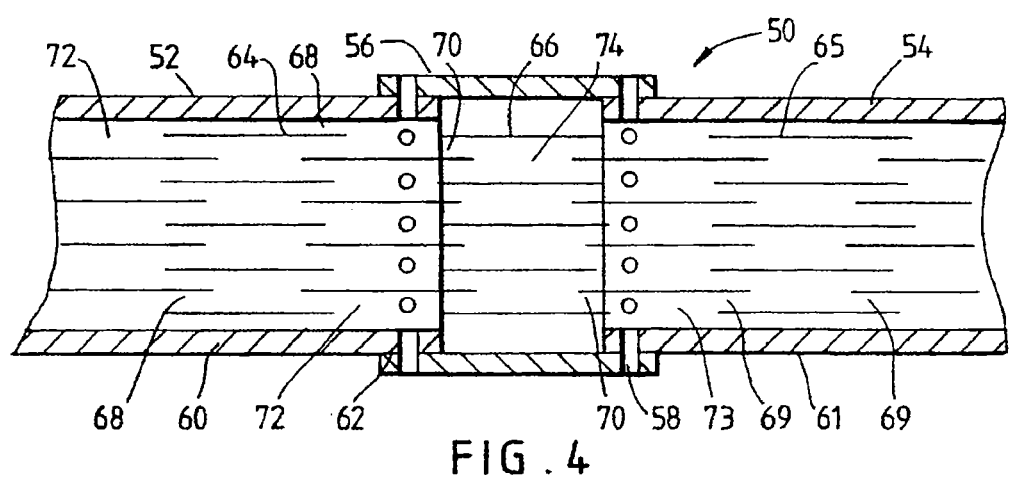
FIG. 4 is a sectional view of FIG. 3.

Reference is now made to FIGS. 3 and 4 of the drawings which will illustrate an arrangement 50 for connecting first and second lengths 52, 54 of expandable tubing utilizing an expandable sleeve 56 secured to the ends of the tubing lengths 52, 54 by screws 58. The tubing walls 60, 61 and the sleeve wall 62 define overlapping longitudinal slots 64, 65, 66. Expansion of the tubing lengths 52, 54 and the sleeve 56 is accommodated by deformation of fingers of material 68, 69, 70 where the slots 64, 65, 66 overlap, and following deformation the slots 64, 65, 66 define diamond-shaped apertures. During expansion there is little or no deformation of the nodes 72, 73, 74 between the longitudinally spaced slots 64, 65, 66, and the screws 58 pass through bores in the endmost nodes 72, 73, 74 of the tubing lengths 52, 54 and the sleeve 56, at the ends of the tubing lengths 52, 54 and sleeve 56. Thus, the endmost deformable fingers 68, 69 of the tubing lengths 52, 54 are axially spaced from the endmost fingers 70 of the sleeve 56.

In use, the tubing lengths 52, 54 and sleeve 56 are shipped in disassembled form. The tubing lengths 52, 54 are made up on surface as the tubing is fed into the bore in which the tubing is to be utilized. In particular, the ends of the tubing lengths 52, 54 are located in the respective ends of the sleeve 56. The screws 58 are then located and tightened in the screw bores. A number of tubing lengths are made up to provide the desired length of tubing and the assembled tubing run into the bore. On reaching the desired location downhole, the tubing is anchored in place, and an expansion cone then pushed or pulled through the tubing. The cone expands the tubing length 52, 54 radially outwards such that, as mentioned above, the slots 64, 65, 66 become diamond-shaped, with the expansion being accommodated by deformation of the fingers 68, 69, 70. The sleeve 56 deforms in a similar manner to the tubing lengths 52, 54. On moving through the arrangement 50, the expansion cone deforms, in turn, the endmost fingers 68 of the first tubing length 52, the fingers 70a at the first end of the sleeve 56, the fingers 70b at the second end of the sleeve 56, and finally the endmost fingers 69 of the second tubing length 54.

In testing it has been found that the forces required to expand the connecting arrangement 50 are the same or only slightly higher than the forces required to expand the tubing lengths 52, 54. Also, the expanded sleeve 56 tends to retain its expanded form, and suffers little or no diametrical shrinkage after the expansion cone has passed through the sleeve 56. Thus, the present invention avoids the difficulties experienced with previously proposed sleeve connectors. Further, the connection arrangement 50 is less expensive to produce than the male\female connectors as described in WO96\37687 and WO97\21901.

Figure 5:
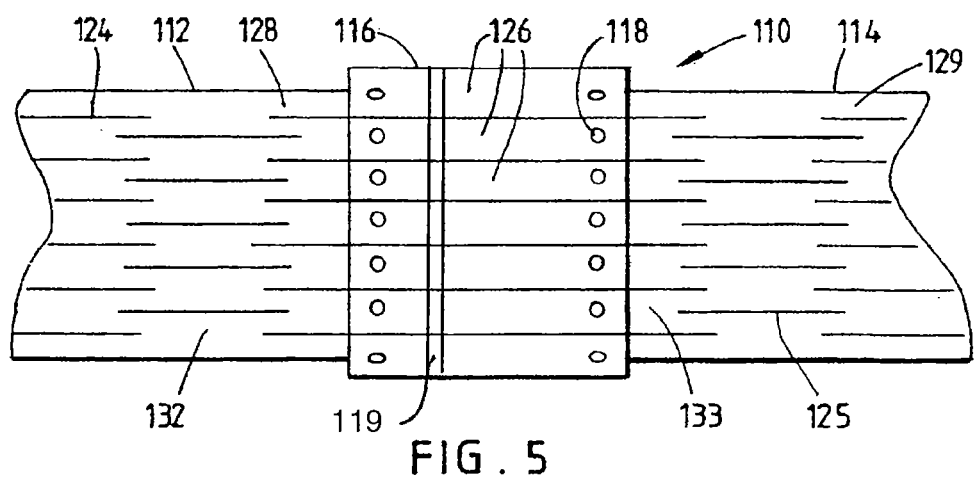
FIG. 5 is a schematic plan view of an arrangement for coupling lengths of expandable tubing in accordance with a third embodiment of the present invention.

Reference is now made to FIG. 5 of the drawings, which illustrates an alternative arrangement 110 for connecting first and second lengths 112, 114 of expandable tubing utilizing an expandable sleeve 116 secured to the ends of the tubing lengths 112, 114 by screws 118. The tubing walls define overlapping longitudinal slots 124, 125. However, unlike the first described embodiment, the sleeve wall is formed of individual longitudinally extending strips 126. Expansion of the tubing lengths 112, 114 and the sleeve 116 is accommodated by deformation of fingers of material 128, 129 where the slots 124, 125 overlap, and circumferential separation of the sleeve strips 126. Following deformation the slots 124, 125 define diamond-shaped apertures. During expansion there is little or no deformation of the nodes 132, 133 between the longitudinally spaced slots 124, 125, and the screws 118 pass through bores in the endmost nodes 132, 133 of the tubing lengths 112, 114 and the ends of the sleeve strips 126.

It will further be apparent for those of skill in the art that the above-described embodiment is merely exemplary of the present invention, and that various modifications and improvements may be made thereto, without departing from the scope of the present invention.

I claim:

1. A method for coupling and expanding expandable wellbore tubing, comprising:
    providing a first connection portion formed at an end of a first tubular member and a mating second connection portion formed at an end of a second tubular member;
    coupling the connection portions to form a connection between the connection portions by inter-engaging the connection portions along a length of a coaxial surface of the first and second tubular members, wherein a third tubular member is disposed adjacent the connection portions along a surface parallel to a longitudinal axis of the first and second tubular members; and
    running an expansion member through the tubular members to extend the connection in a radial direction.

2. The method of claim 1, wherein running the expansion member through the tubular members includes pushing an expansion cone through the tubular members.

3. The method of claim 1, wherein running the expansion member through the tubular members includes pulling an expansion cone through the tubular members.

4. The method of claim 1, wherein coupling the connection portions includes threading the connection portions together.

5. The method of claim 4, wherein the first and second tubular members comprise expandable slotted tubular members.

6. The method of claim 1, wherein the third tubular member is disposed inside the connection portions upon coupling of the connection portions.

7. The method of claim 1, wherein the first and second tubular members comprise expandable slotted tubular members.

8. The method of claim 1, wherein the second connection portion is disposed between the first connection portion and the third tubular member upon coupling of the connection portions.

9. The method of claim 8, wherein the third tubular member is connected to the first tubular member.

10. The method of claim 1, wherein the third tubular member is connected to the first tubular member.

11. A method for coupling and expanding expandable wellbore tubing, comprising:
   providing a first connection portion formed at an end of a first tubular portion and a mating second connection portion formed at an end of a second tubular portion;
   coupling the connection portions to form a connection between the connection portions by inter-engaging the connection portions along a length of a coaxial surface of the first and second tubular portions, wherein a third tubular portion is disposed adjacent the connection portions along a surface parallel to a longitudinal axis of the first and second tubular portions; and
   expanding the tubular portions to extend the connection in a radial direction.

12. The method of claim 11, wherein expanding the tubular portions includes pushing an expansion cone through the tubular portions.

13. The method of claim 11, wherein expanding the tubular portions includes pulling an expansion cone through the tubular portions.

14. The method of claim 11, wherein coupling the connection portions includes threading the connection portions together.

15. The method of claim 14, wherein the first and second tubular portions comprise expandable slotted tubular portions.

16. The method of claim 11, wherein the third tubular portion is disposed inside the connection portions upon coupling of the connection portions.

17. The method of claim 11, wherein the first and second tubular portions comprise expandable slotted tubular portions.

18. The method of claim 11, wherein the second connection portion is disposed between the first connection portion and the third tubular portion upon coupling of the connection portions.

19. The method of claim 18, wherein the third tubular portion is connected to the first tubular portion.

20. The method of claim 11, wherein the third tubular portion is connected to the first tubular portion.

* * * * *